(12) United States Patent
Bhattacharya

(10) Patent No.: US 12,008,575 B2
(45) Date of Patent: Jun. 11, 2024

(54) SYSTEMS AND METHODS TO MANAGE TRANSACTION BETWEEN PROVIDING ENTITY AND RECEIVING ENTITY

(71) Applicant: Visa International Service Association, San Francisco, CA (US)

(72) Inventor: Som Madhab Bhattacharya, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 262 days.

(21) Appl. No.: 17/498,202

(22) Filed: Oct. 11, 2021

(65) Prior Publication Data

US 2023/0114793 A1   Apr. 13, 2023

(51) Int. Cl.
*G06Q 20/40* (2012.01)
*G06Q 20/06* (2012.01)

(52) U.S. Cl.
CPC ......... *G06Q 20/405* (2013.01); *G06Q 20/065* (2013.01); *G06Q 20/401* (2013.01)

(58) Field of Classification Search
CPC ............... G06F 9/466; G06F 16/24556; G06F 16/2455; G06Q 20/36; G06Q 20/4016; G06Q 20/027
See application file for complete search history.

(56) References Cited

U.S. PATENT DOCUMENTS

| | | | |
|---|---|---|---|
| 2014/0244493 A1* | 8/2014 | Kenyon | G06Q 20/36 705/41 |
| 2016/0224993 A1* | 8/2016 | Miller | G06F 16/24556 |
| 2018/0006897 A1* | 1/2018 | Kanza | G06F 16/2455 |
| 2018/0196694 A1* | 7/2018 | Banerjee | G06F 9/466 |
| 2019/0188578 A1* | 6/2019 | Manoharan | G06Q 20/4016 |
| 2019/0342205 A1* | 11/2019 | Ur | G06Q 20/027 |

* cited by examiner

*Primary Examiner* — Saba Dagnew
(74) *Attorney, Agent, or Firm* — The Webb Law Firm

(57) ABSTRACT

The present disclosure relates to systems and methods for managing a transaction between a providing entity and a receiving entity. Initially, a request to initiate a transaction is received from a receiving entity. One or more entity parameters associated with the receiving entity are extracted upon receiving the request. Each of the one or more entity parameters is matched with pre-determined transaction rules related to a plurality of providing entities registered with the system to identify at least one providing entity for the receiving entity. The transaction from the at least one providing entity to the receiving entity is enabled for the request. Using the proposed system, transactions are performed in accordance with the preferences of the one or more providing entities. Also, the proposed system provisions to keep transactions transparent between the providing entity and the receiving entity.

12 Claims, 14 Drawing Sheets

SYSTEMS AND METHODS TO MANAGE TRANSACTION BETWEEN PROVIDING ENTITY AND RECEIVING ENTITY

BACKGROUND

1. Technical Field

The present disclosure relates generally to managing transactions and more specifically, but not particularly to, systems and methods to manage a transaction between a providing entity and a receiving entity based on transactional rules related to a plurality of providing entities.

2. Technical Considerations

Transactions between two entities may be a donation, business investment, funding amongst departments or to events within organizations, gifting, and the like. Such transactions may involve money providing entities and money receiving entities. The money providing entities may be donors, investors, charities, relatives, management of an organization, and the like. With existing systems, such transactions between the money providing entities and the money receiving entities may not be monitored. Some intermediate platforms may provide support in transactions of money between the money providing entities and the money receiving entities. However, the intermediate platforms may only just aid in completing the transactions based on a request from the money receiving entities. The intermediate platforms may not consider the preferences of the money providing entities when performing transactions. Some of the money providing entities may have preferences on the type of receiving entity that they wish to donate to. For example, an investor may wish to only invest money in communities which deal with building infrastructure for education. In another example, a donor may wish to donate money only to orphanages. Also, some transaction preferences may be related to currency transactions or location as well. For example, a donor may wish to donate to the money receiving entities which are based out of India and prefer to donate in U.S. dollars only. In some instances, the money providing entities may not be aware of the money receiving entity for whom they have funded.

The information disclosed in this background of the disclosure section is only for enhancement of understanding of the general background of the disclosure and should not be taken as an acknowledgement or any form of suggestion that this information forms the existing art already known to a person skilled in the art.

SUMMARY

Additional features and advantages are realized through the techniques of the present disclosure. Other embodiments and aspects of the disclosure are described in detail herein and are considered a part of the claimed disclosure.

In non-limiting embodiments or aspects, provided is a computer-implemented method for managing a transaction between a providing entity and a receiving entity, the method comprising: receiving a request to initiate a transaction from a receiving entity; extracting one or more entity parameters associated with the receiving entity upon receiving the request; matching each of the one or more entity parameters with pre-determined transaction rules related to a plurality of providing entities registered with a system to identify at least one providing entity for the receiving entity; and enabling the transaction from the at least one providing entity to the receiving entity.

In some non-limiting embodiments or aspects, the method further comprises declining the request when the at least one providing entity is not identified upon performing matching of each of the one or more entity parameters with the pre-determined transaction rules related to the plurality of providing entities. In some non-limiting embodiments or aspects, the method further comprises generating the pre-determined transaction rules based on one or more transaction preferences provided by each of the plurality of providing entities.

In some non-limiting embodiments or aspects, the pre-determined transaction rules comprises a structural tree comprising a plurality of layers with a plurality of nodes, wherein each node of the plurality of nodes in a bottom layer of the plurality of layers represent a value of transaction to be provided by a providing entity of plurality of providing entities, wherein the plurality of nodes in intermediate layers of the plurality of layers represent each of the one or more transaction preferences provided by the plurality of providing entities, wherein a top layer of the plurality of layers comprises a single node representing a transaction token configured to enable the transaction between the at least one providing entity and the receiving entity.

In some non-limiting embodiments or aspects, each of the plurality of nodes between the plurality of layers is linked based on the one or more transaction preferences provided by each of the plurality of providing entities. In some non-limiting embodiments or aspects, matching each of the one or more entity parameters with the pre-determined transaction rules comprises: identifying matching nodes amongst the plurality of nodes of the plurality of layers with representation matching each of the one or more entity parameters; activating links between the matching nodes to identify an unbroken link between at least one node in the bottom layer to the single node in the top layer through nodes in the intermediate layers; and selecting a providing entity related to the at least one node to be the at least one providing entity for enabling the transaction.

In non-limiting embodiments or aspects, provided is a system, comprising: one or more processors; and a memory communicatively coupled to the one or more processors, wherein the memory stores processor-executable instructions, which, on execution, cause the one or more processors to: receive a request to initiate a transaction from a receiving entity; extract one or more entity parameters associated with the receiving entity upon receiving the request; match each of the one or more entity parameters with pre-determined transaction rules related to a plurality of providing entities registered with the system to identify at least one providing entity for the receiving entity; and enable the transaction from the at least one providing entity to the receiving entity.

In some non-limiting embodiments or aspects, the one or more processors are further configured to decline the request when the at least one providing entity is not identified upon performing matching of each of the one or more entity parameters with the transaction rules related to the plurality of providing entities. In some non-limiting embodiments or aspects, the one or more processors are further configured to generate the pre-determined transaction rules based on one or more transaction preferences provided by each of the plurality of providing entities.

In some non-limiting embodiments or aspects, the pre-determined transaction rules comprises a structural tree comprising a plurality of layers with a plurality of nodes, wherein each node of the plurality of nodes in a bottom layer of the plurality of layers represent a value of transaction to be provided by a providing entity of plurality of providing entities, wherein the plurality of nodes in intermediate layers of the plurality of layers represent each of the one or more transaction preferences provided by the plurality of providing entities, wherein a top layer of the plurality of layers comprises a single node representing a transaction token configured to enable the transaction between the at least one providing entity and the receiving entity.

In some non-limiting embodiments or aspects, each of the plurality of nodes between the plurality of layers is linked based on the one or more transaction preferences provided by each of the plurality of providing entities. In some non-limiting embodiments or aspects, matching each of the one or more entity parameters with the pre-determined transaction rules comprises: identifying matching nodes amongst the plurality of nodes of the plurality of layers with representation matching each of the one or more entity parameters; activating links between the matching nodes to identify an unbroken link between at least one node in the bottom layer to the single node in the top layer through nodes in the intermediate layers; and selecting a providing entity related to the at least one node to be the at least one providing entity for enabling the transaction.

In non-limiting embodiments or aspects, provided is a non-transitory computer readable medium including instructions stored thereon that when processed by one or more processors cause a system to: receive a request to initiate a transaction from a receiving entity; extract one or more entity parameters associated with the receiving entity upon receiving the request; match each of the one or more entity parameters with pre-determined transaction rules related to a plurality of providing entities registered with the system to identify at least one providing entity for the receiving entity; and enable the transaction from the at least one providing entity to the receiving entity.

In some non-limiting embodiments or aspects, the instructions cause the system to decline the request when the at least one providing entity is not identified upon performing matching of each of the one or more entity parameters with the transaction rules related to the plurality of providing entities. In some non-limiting embodiments or aspects, the instructions cause the system to generate the pre-determined transaction rules based on one or more transaction preferences provided by each of the plurality of providing entities.

In some non-limiting embodiments or aspects, the pre-determined transaction rules comprises a structural tree comprising a plurality of layers with a plurality of nodes, wherein each node of the plurality of nodes in a bottom layer of the plurality of layers represent a value of transaction to be provided by a providing entity of plurality of providing entities, wherein the plurality of nodes in intermediate layers of the plurality of layers represent each of the one or more transaction preferences provided by the plurality of providing entities, wherein a top layer of the plurality of layers comprises a single node representing a transaction token configured to enable the transaction between the at least one providing entity and the receiving entity.

In some non-limiting embodiments or aspects, each of the plurality of nodes between the plurality of layers is linked based on the one or more transaction preferences provided by each of the plurality of providing entities. In some non-limiting embodiments or aspects, matching each of the one or more entity parameters with the pre-determined transaction rules comprises: identifying matching nodes amongst the plurality of nodes of the plurality of layers with representation matching each of the one or more entity parameters; activating links between the matching nodes to identify an unbroken link between at least one node in the bottom layer to the single node in the top layer through nodes in the intermediate layers; and selecting a providing entity related to the at least one node to be the at least one providing entity for enabling the transaction.

Further non-limiting embodiments or aspects are set forth in the following numbered clauses.

Clause 1: A computer-implemented method for managing a transaction between a providing entity and a receiving entity, the method comprising: receiving a request to initiate a transaction from a receiving entity; extracting one or more entity parameters associated with the receiving entity upon receiving the request; matching each of the one or more entity parameters with pre-determined transaction rules related to a plurality of providing entities registered with a system to identify at least one providing entity for the receiving entity; and enabling the transaction from the at least one providing entity to the receiving entity.

Clause 2: The computer-implemented method of clause 1, further comprising declining the request when the at least one providing entity is not identified upon performing matching of each of the one or more entity parameters with the pre-determined transaction rules related to the plurality of providing entities.

Clause 3: The computer-implemented method of clause 1 or 2, further comprising generating the pre-determined transaction rules based on one or more transaction preferences provided by each of the plurality of providing entities.

Clause 4: The computer-implemented method of any of clauses 1-3, wherein the pre-determined transaction rules comprises a structural tree comprising a plurality of layers with a plurality of nodes, wherein each node of the plurality of nodes in a bottom layer of the plurality of layers represent a value of transaction to be provided by a providing entity of plurality of providing entities, wherein the plurality of nodes in intermediate layers of the plurality of layers represent each of the one or more transaction preferences provided by the plurality of providing entities, wherein a top layer of the plurality of layers comprises a single node representing a transaction token configured to enable the transaction between the at least one providing entity and the receiving entity.

Clause 5: The computer-implemented method of any of clauses 1-4, wherein each of the plurality of nodes between the plurality of layers is linked based on the one or more transaction preferences provided by each of the plurality of providing entities.

Clause 6: The computer-implemented method of any of clauses 1-5, wherein matching each of the one or more entity parameters with the pre-determined transaction rules comprises: identifying matching nodes amongst the plurality of nodes of the plurality of layers with representation matching each of the one or more entity parameters; activating links between the matching nodes to identify an unbroken link between at least one node in the bottom layer to the single node in the top layer through nodes in the intermediate layers; and selecting a providing entity related to the at least one node to be the at least one providing entity for enabling the transaction.

Clause 7: A system, comprising: one or more processors; and a memory communicatively coupled to the one or more processors, wherein the memory stores processor-executable instructions, which, on execution, cause the one or more processors to: receive a request to initiate a transaction from a receiving entity; extract one or more entity parameters associated with the receiving entity upon receiving the request; match each of the one or more entity parameters with pre-determined transaction rules related to a plurality of providing entities registered with the system to identify at least one providing entity for the receiving entity; and enable the transaction from the at least one providing entity to the receiving entity.

Clause 8: The system of clause 7, wherein the one or more processors are further configured to decline the request when the at least one providing entity is not identified upon performing matching of each of the one or more entity parameters with the transaction rules related to the plurality of providing entities.

Clause 9: The system of clause 7 or 8, wherein the one or more processors are further configured to generate the pre-determined transaction rules based on one or more transaction preferences provided by each of the plurality of providing entities.

Clause 10: The system of any of clauses 7-9, wherein the pre-determined transaction rules comprises a structural tree comprising a plurality of layers with a plurality of nodes, wherein each node of the plurality of nodes in a bottom layer of the plurality of layers represent a value of transaction to be provided by a providing entity of plurality of providing entities, wherein the plurality of nodes in intermediate layers of the plurality of layers represent each of the one or more transaction preferences provided by the plurality of providing entities, wherein a top layer of the plurality of layers comprises a single node representing a transaction token configured to enable the transaction between the at least one providing entity and the receiving entity.

Clause 11: The system of any of clauses 7-10, wherein each of the plurality of nodes between the plurality of layers is linked based on the one or more transaction preferences provided by each of the plurality of providing entities.

Clause 12: The system of any of clauses 7-11, wherein matching each of the one or more entity parameters with the pre-determined transaction rules comprises: identifying matching nodes amongst the plurality of nodes of the plurality of layers with representation matching each of the one or more entity parameters; activating links between the matching nodes to identify an unbroken link between at least one node in the bottom layer to the single node in the top layer through nodes in the intermediate layers; and selecting a providing entity related to the at least one node to be the at least one providing entity for enabling the transaction.

Clause 13: A non-transitory computer readable medium including instructions stored thereon that when processed by one or more processors cause a system to: receive a request to initiate a transaction from a receiving entity; extract one or more entity parameters associated with the receiving entity upon receiving the request; match each of the one or more entity parameters with pre-determined transaction rules related to a plurality of providing entities registered with the system to identify at least one providing entity for the receiving entity; and enable the transaction from the at least one providing entity to the receiving entity.

Clause 14: The medium of clause 13, wherein the instructions cause the system to decline the request when the at least one providing entity is not identified upon performing matching of each of the one or more entity parameters with the transaction rules related to the plurality of providing entities.

Clause 15: The medium of clause 13 or 14, wherein the instructions cause the system to generate the pre-determined transaction rules based on one or more transaction preferences provided by each of the plurality of providing entities.

Clause 16: The medium of any of clauses 13-15, wherein the pre-determined transaction rules comprises a structural tree comprising a plurality of layers with a plurality of nodes, wherein each node of the plurality of nodes in a bottom layer of the plurality of layers represent a value of transaction to be provided by a providing entity of plurality of providing entities, wherein the plurality of nodes in intermediate layers of the plurality of layers represent each of the one or more transaction preferences provided by the plurality of providing entities, wherein a top layer of the plurality of layers comprises a single node representing a transaction token configured to enable the transaction between the at least one providing entity and the receiving entity.

Clause 17: The medium of any of clauses 13-16, wherein each of the plurality of nodes between the plurality of layers is linked based on the one or more transaction preferences provided by each of the plurality of providing entities.

Clause 18: The medium of any of clauses 13-17, wherein matching each of the one or more entity parameters with the pre-determined transaction rules comprises: identifying matching nodes amongst the plurality of nodes of the plurality of layers with representation matching each of the one or more entity parameters; activating links between the matching nodes to identify an unbroken link between at least one node in the bottom layer to the single node in the top layer through nodes in the intermediate layers; and selecting a providing entity related to the at least one node to be the at least one providing entity for enabling the transaction.

In some non-limiting embodiments or aspects, the present disclosure relates to a computer-implemented method for managing a transaction between a providing entity and a receiving entity. Initially, a request to initiate a transaction is received from a receiving entity. One or more entity parameters associated with the receiving entity are extracted upon receiving the request. Each of the one or more entity parameters is matched with pre-determined transaction rules related to a plurality of providing entities registered with the system to identify at least one providing entity for the receiving entity. A transaction from the at least one providing entity to the receiving entity is enabled for the request.

In some non-limiting embodiments or aspects, the present disclosure relates to a system for managing a transaction between a providing entity and a receiving entity. The system includes a processor and a memory communicatively coupled to the processor. The memory stores processor-executable instructions, which on execution cause the processor to manage the transaction. Initially, a request to initiate a transaction is received from a receiving entity. One or more entity parameters associated with the receiving entity are extracted, upon receiving the request. Each of the one or more entity parameters is matched with pre-determined transaction rules related to a plurality of providing entities registered with the system to identify at least one providing entity for the receiving entity. The transaction from the at least one providing entity to the receiving entity is enabled for the request.

In some non-limiting embodiments or aspects, the present disclosure relates to a non-transitory computer-readable medium including instructions stored thereon. The instructions, when processed by at least one processor, cause a device to manage the transaction. Initially, a request to initiate a transaction is received from a receiving entity. One or more entity parameters associated with the receiving entity are extracted upon receiving the request. Each of the one or more entity parameters is matched with pre-determined transaction rules related to a plurality of providing entities registered with the system to identify at least one providing entity for the receiving entity. The transaction from the at least one providing entity to the receiving entity is enabled for the request.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more non-limiting embodiments or aspects are now described, by way of example only, with reference to the accompanying figures wherein like reference numerals represent like elements and in which:

Figure 1A:
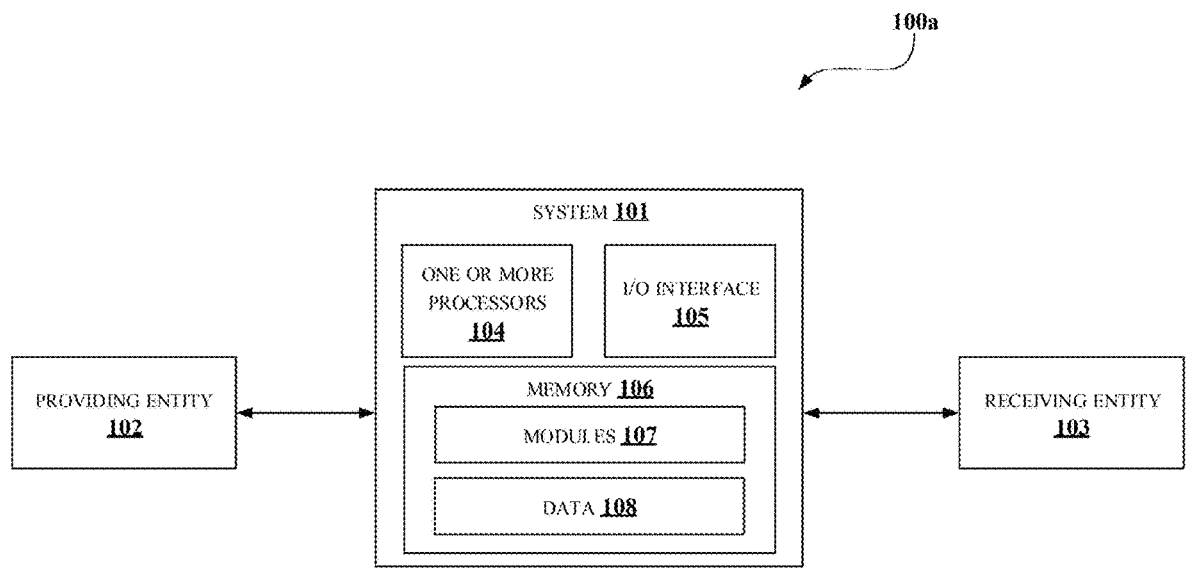
FIGS. 1a and 1b show exemplary environments of a system for managing transaction between a providing entity and a receiving entity in accordance with some non-limiting embodiments or aspects of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in a computer-readable medium and executed by a computer or processor, whether or not such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the term "exemplary" is used herein to mean "serving as an example, instance, or illustration." Any embodiment, aspect, or implementation of the present subject matter described herein as "exemplary" is not necessarily to be construed as preferred or advantageous over other embodiments.

In the following detailed description of non-limiting embodiments or aspects of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion such that a setup, device, or method that comprises a list of components or steps does not include only those components or steps but may include other components or steps not expressly listed or inherent to such setup, device, or method. In other words, one or more elements in a system or apparatus proceeded by "comprises . . . a" do not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" do not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/feature. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices or computing units, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The present disclosure relates to a method and system for managing a transaction between a providing entity and a receiving entity. The transaction is managed based on pre-determined transaction rules related to a plurality of providing entities. When a request to initiate a transaction is obtained from a receiving entity, one or more entity parameters of the receiving entity are considered and matched with the pre-determined transaction rules. Based on matching, if one or more providing entities are identified for the receiving entity, a transaction between the one or more providing entities and the receiving entities is enabled. By the proposed system, transactions are performed as per preferences of the one or more providing entity. Also, the proposed system provisions to keep transactions transparent between the providing entity and the receiving entity.

Figure 1B:
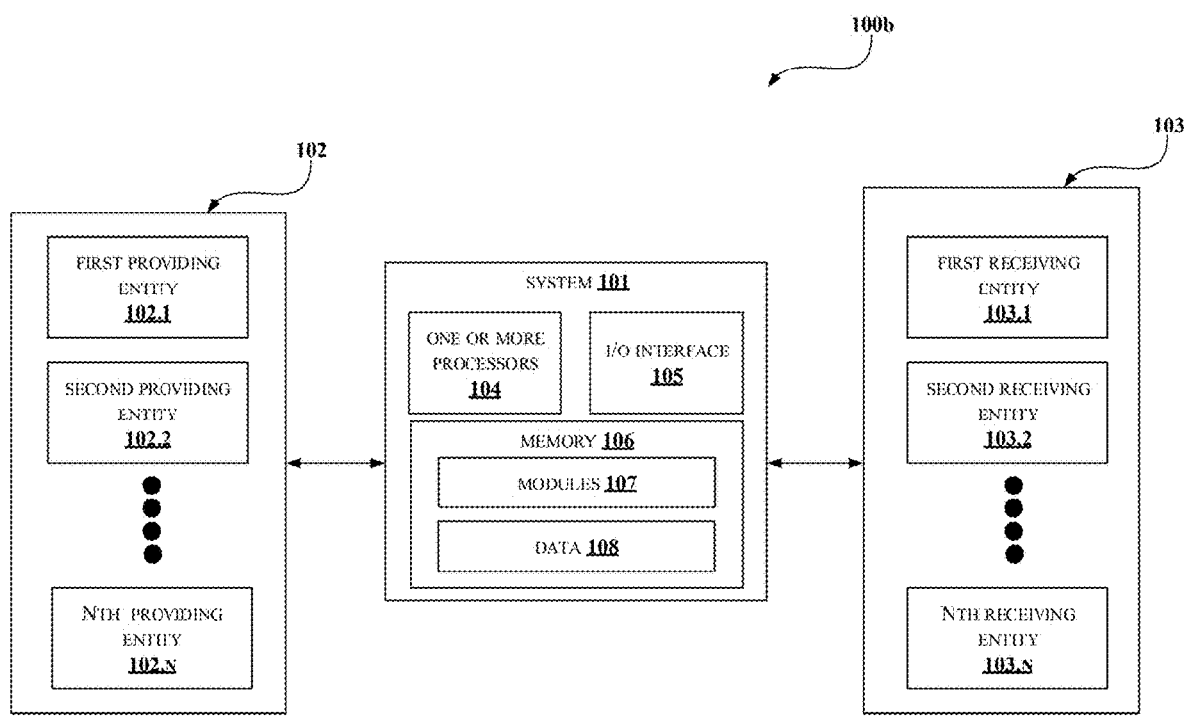

FIG. 1a shows an exemplary environment 100a of a system 101 for managing transaction between a providing entity 102 and a receiving entity 103, in accordance with some non-limiting embodiments or aspects of the present disclosure. The environment 100a may include the system 101 in communication with the providing entity 102 and the receiving entity 103. The exemplary environment 100a may be an environment of an online platform wherein the providing entity 102 and the receiving entity 103 communicate via the system 101 to perform a transaction. In some non-limiting embodiments or aspects, in an environment 100b shown in FIG. 1b, the system 101 may be in communication with a plurality of providing entities and a plurality of receiving entities to enable a transaction between each of the plurality of providing entities and each of the plurality of receiving entities. The plurality of providing entities may include a first providing entity 102.1, a second providing entity 102.2, . . . , an Nth providing entity 102.N, and the like, and together or individually may be referred to as a plurality of providing entities 102 or a providing entity 102. The plurality of receiving entities may include a first receiving entity 103.1, a second receiving entity 103.2, . . . , an Nth receiving entity 103.N, and the like, and together or individually may be referred to as a plurality of receiving entities 103 or a receiving entity 103.

The providing entity 102 may be an entity which provides or funds money for the transaction. The providing entity 102 may be a donor, a charity, an investor, a funding organization, and the like. Initially, each of the plurality of providing entities 102 may pre-register with the system 101 for the transaction. During the registration, each of the plurality of providing entities 102 may provide their details along with their preferences related to a transaction. The preferences may be related to type of a receiving entity, location of a receiving entity, currency of money for transaction and the like. By registering with the system 101, each of the plurality of providing entities 102 may create an account with the system 101. In some non-limiting embodiments or aspects, along with the preferences, each of the plurality of providing entities 102 may also provide details of their respective bank account to enable debiting of money for the transaction.

The receiving entity 103 may be an entity which receives money during the transaction. The receiving entity 103 may be an orphanage, an individual, a charity, a Non-Governmental Organisation (NGO), a government organization, a non-profit organization, start-up catering to a specific sector platform, and the like. Initially, each of the plurality of receiving entities 103 may register with the system 101. During the registration, each of the plurality of receiving entities 103 may provide their details. The details may include type of donation they wish to seek, purpose of the donation, their location, their preferences on currency, and the like. By registering with the system 101, each of the plurality of receiving entities 103 may also create an account with the system 101. In some non-limiting embodiments or aspects, along with the details, each of the plurality of receiving entities 103 may also provide details of their respective bank account to enable credit of money for the transaction. In some non-limiting embodiments or aspects, the receiving entity 103 may register with the system 101 when providing the request for the transaction.

The system 101 may include one or more processors 104, an Input/Output (I/O) interface 105, and a memory 106. In some non-limiting embodiments or aspects, the memory 106 may be communicatively coupled to the one or more processors 104. The memory 106 stores instructions, executable by the one or more processors 104, which on execution, may cause the system 101 to manage the transaction between the providing entity 102 and the receiving entity 103 as proposed in the present disclosure. In some non-limiting embodiments or aspects, the memory 106 may include one or more modules 107 and data 108. The one or more modules 107 may be configured to perform the steps of the present disclosure using the data 108 to manage the transaction. In some non-limiting embodiments or aspects, each of the one or more modules 107 may be a hardware unit which may be outside the memory 106 and coupled with the system 101. In some non-limiting embodiments or aspects, the system 101 may be implemented in a variety of computing systems, such as a laptop computer, a desktop computer, a Personal Computer (PC), a notebook, a smartphone, a tablet, e-book readers, a server, a network server, a cloud server, and the like.

The system 101 may be in communication with each of the plurality of providing entities 102 and each of the plurality of receiving entities 103 for managing the transaction. In some non-limiting embodiments or aspects, the system 101 may communicate with at least one of the plurality of providing entities 102 and the plurality of receiving entities 103 via a communication network (not shown in the figure). The communication network may include, without limitation, a direct interconnection, Local Area Network (LAN), Wide Area Network (WAN), a wireless network (e.g., using Wireless Application Protocol), the Internet, and the like. In some non-limiting embodiments or aspects, a dedicated communication network may be implemented to establish communication between the system 101 and each of the plurality of providing entities 102 and each of the plurality of receiving entities 103.

For managing transactions between the providing entity 102 and the receiving entity 103, the system 101 may be configured to initially receive a request to initiate a transaction. The request may be provided by the receiving entity 103 when in need of money. In some non-limiting embodiments or aspects, the request may be provided by the receiving entity 103 when performing registration with the system 101. In some non-limiting embodiments or aspects, the request may accompany further details such as an amount of money that is required by the receiving entity 103, bank account details to which money is to be credited, entity parameters related to the receiving entity 103, and the like. Further information, which may be related to enable the transaction between the providing entity 102 and the receiving entity 103, may be provided by the receiving entity 103, along with the request.

Upon receiving the request, the system 101 may be configured to extract one or more entity parameters associated with the receiving entity 103. In some non-limiting embodiments or aspects, the one or more entity parameter may indicate details of the receiving entity 103. In some non-limiting embodiments or aspects, the one or more entity parameters may be extracted and stored during registration of the receiving entity 103. In some non-limiting embodiments or aspects, the one or more entity parameters may be extracted from the details provided by the receiving entity 103 when providing the request. The one or more entity parameters may include, but are not limited to, information related to the type of the receiving entity 103, location of the receiving entity 103, currency accepted by the receiving entity 103, purpose for which money is requested, and the like. Further information related to the receiving entity 103 may be extracted as the one or more entity parameters.

Further, the system 101 may be configured to match each of the extracted one or more entity parameters with pre-determined transaction rules related to the plurality of providing entities 102 registered with the system 101. The matching may be performed to identify at least one providing entity 102 for the receiving entity 103.

In some non-limiting embodiments or aspects, the pre-determined transaction rules may be pre-stored data stored in the memory 106 of the system 101. In some non-limiting embodiments or aspects, the system 101 may be configured to generate the pre-determined transaction rules based on one or more transaction preferences provided by each of the plurality of providing entities 102. The one or more transaction preferences may be provided during registration of the each of the plurality of providing entities 102 with the system 101. In some non-limiting embodiments or aspects, the pre-determined transaction rules may be a structural tree comprising a plurality of layers with a plurality of nodes. The plurality of layers may include a bottom layer, one or more intermediate layers, and a top layer. In some non-limiting embodiments or aspects, each node of the plurality of nodes in the bottom layer represents a value of the transaction to be provided by the providing entity 102. In some non-limiting embodiments or aspects, the plurality of nodes, in the one or more intermediate layers, may represent each of the one or more transaction preferences provided by the plurality of providing entities 102. In some non-limiting embodiments or aspects, the top layer may comprise a single node representing a transaction token to enable the transaction between the at least one providing entity 102 and the receiving entity 103. In some non-limiting embodiments or aspects, each of the plurality of nodes between the plurality of layers is linked based on the one or more transaction preferences provided by each of the one or more providing entities 102. In some non-limiting embodiments or aspects, the pre-determined transaction rules may be presented in any preferable format which would enable in matching the one or more entity parameters with the pre-determined transaction rules for further enabling the transaction.

In some non-limiting embodiments or aspects, the system 101 may be configured to match each of the one or more entity parameters with the pre-determined transaction rules. Matching may be performed by identifying matching nodes, amongst the plurality of nodes, with representation matching each of the one or more entity parameters. Further, the system 101 may be configured to activate links between the matching nodes to identify an unbroken link between at least one node in the bottom layer to the single node in the top layer through nodes in the intermediate layers. A providing entity 102 related to the at least one node may be selected to be the at least one providing entity 102 for enabling the transaction.

Upon selecting the at least one providing entity 102, the system 101 may be configured to enable a transaction from the at least one providing entity 102 to the receiving entity 103 for the request received from the receiving entity 103. In some non-limiting embodiments or aspects, by enabling the transaction, the system 101 may be configured to initiate transfer of money requested by the receiving entity 103 from a bank account of the at least one providing entity 102 to a bank account of the receiving entity 103. In some non-limiting embodiments or aspects, the system 101 may further be configured to decline the request when the at least one providing entity 102 is not identified upon performing matching of each of the one or more entity parameters with the transaction rules related to the one or more providing entities 102. The declination may be indicated to the receiving entity 103.

In some non-limiting embodiments or aspects, the system 101 may receive data for managing a transaction between the at least one providing entity 102 and the receiving entity 103 via the I/O interface 105. The received data may include, but is not limited to, at least one of the request from the receiving entity 103, the one or more transaction preferences provided by each of the plurality of providing entities 102, registration information from the plurality of receiving entities 103 and the plurality of providing entities 102, and the like. Also, the system 101 may transmit data, for managing a transaction between the at least one providing entity 102 and the receiving entity 103, via the I/O interface 105. The transmitted data may include, but is not limited to, information on enabling of the transaction to the at least one providing entity 102 and the receiving entity 103 information on declining of transaction to the receiving entity 103, and the like.

Figure 2:
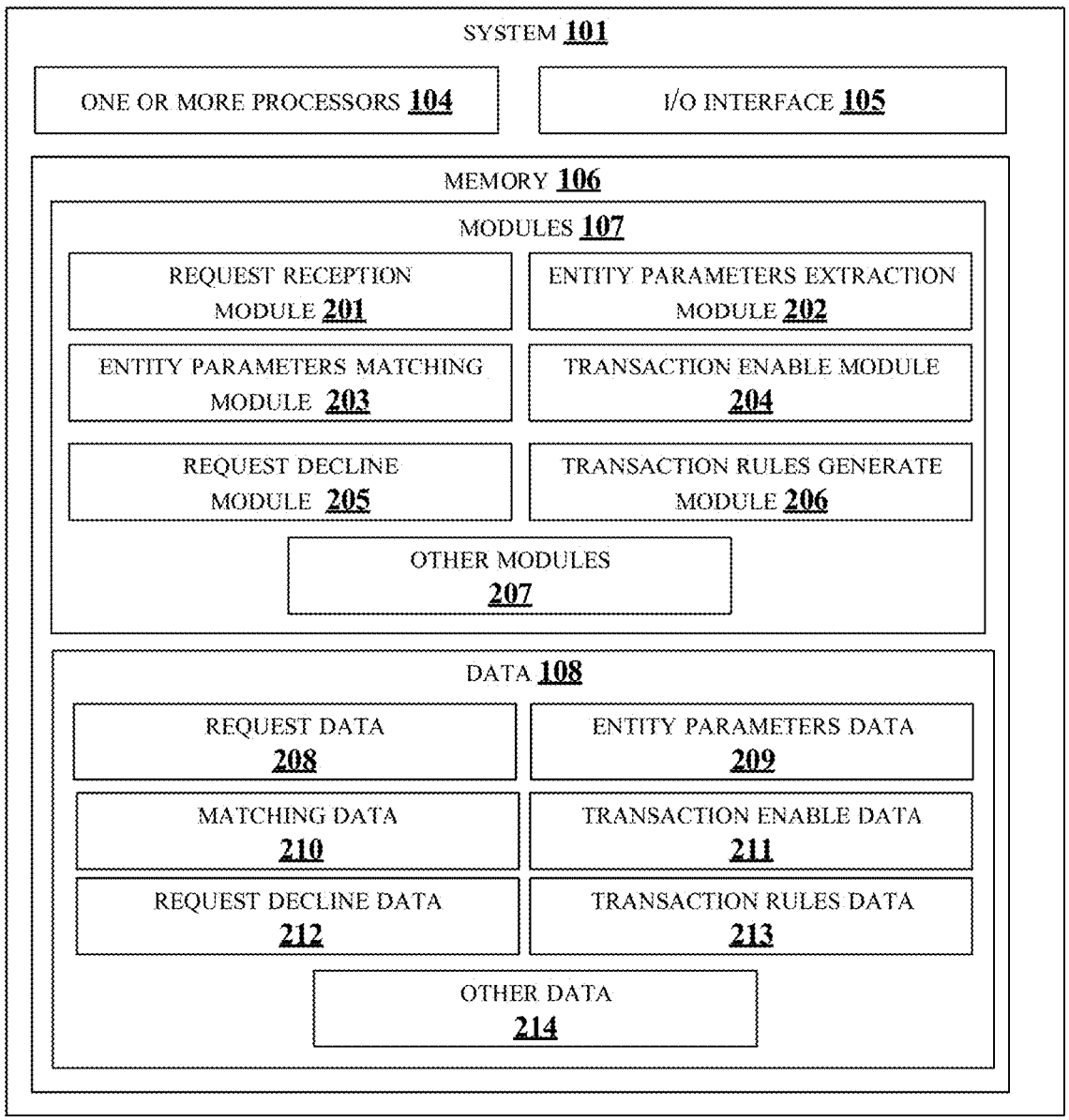
FIG. 2 shows a detailed block diagram of a system for managing transaction between a providing entity and a receiving entity in accordance with some non-limiting embodiments or aspects of the present disclosure.

FIG. 2 shows a detailed block diagram of the system 101 for managing a transaction between the providing entity 102 and the receiving entity 103 in accordance with some non-limiting embodiments or aspects of the present disclosure.

The data 108 and the one or more modules 107 in the memory 106 of the system 101 are described herein in detail. In some non-limiting embodiments or aspects, the one or more modules 107 may include, but are not limited to, a request reception module 201, an entity parameter extraction module 202, an entity parameters matching module 203, a transaction enable module 204, a request decline module 205, a transaction rules generate module 206, and one or more other modules 207 associated with the system 101. In some non-limiting embodiments or aspects, the data 108 in the memory 106 may include request data 208 (also referred to as request 208), entity parameters data 209 (also referred to as one or more entity parameters 209), matching data 210, transaction enable data 211, request decline data 212, transaction rules data 213 (also referred to as pre-determined transaction rules 213), and other data 214 associated with the system 101.

In some non-limiting embodiments or aspects, the data 108 in the memory 106 may be processed by the one or more modules 107 of the system 101. In some non-limiting embodiments or aspects, the one or more modules 107 may be implemented as dedicated units, and when implemented in such a manner, the modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The one or more modules 107 of the present disclosure function to manage the transaction between the at least one providing entity 102 and the receiving entity 103. The one or more modules 107 along with the data 108 may be implemented in any system for managing the transaction.

The proposed system 101 may be configured to facilitate transactions between the at least one providing entity 102 and the receiving entity 103. For facilitating the transactions, it may be required that the plurality of the providing entities 102 and the plurality of receiving entities 103 register with the system 101. For the registration, each of the plurality of the providing entities 102 and the plurality of receiving entities 103 may be required to provide at least one of preferences and parameters associated with the respective entity 103.

Figure 3A:
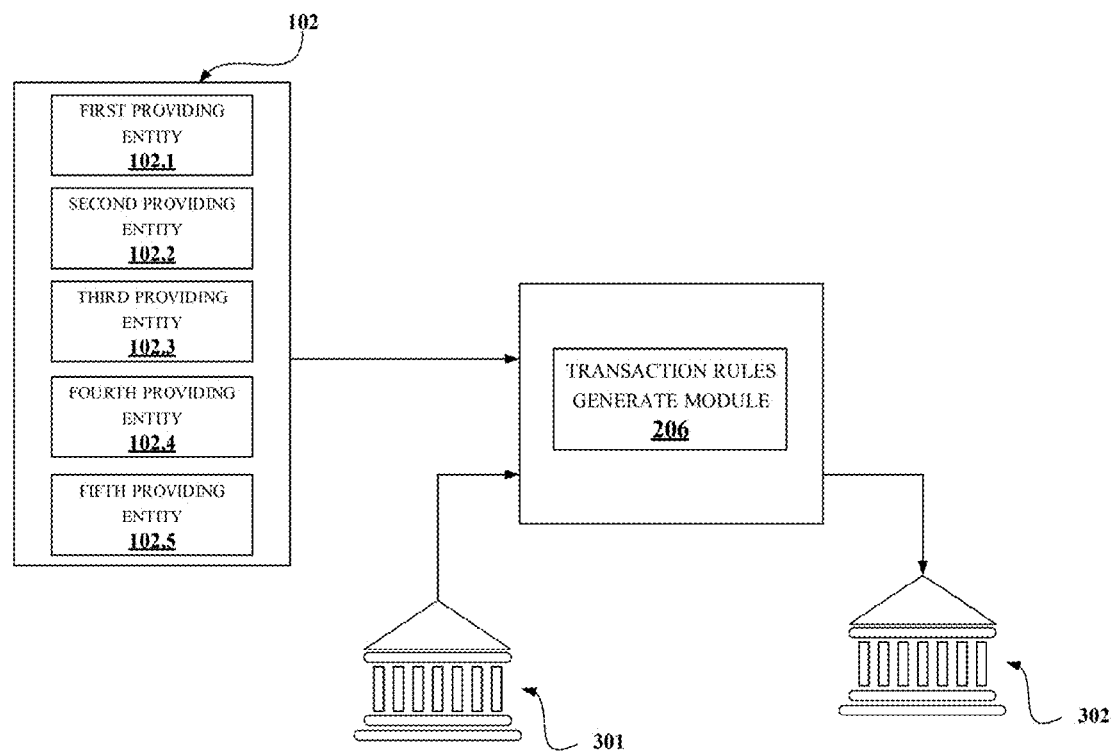
FIGS. 3a-3h illustrate exemplary embodiments for managing a transaction between a providing entity and a receiving entity in accordance with some non-limiting embodiments or aspects of the present disclosure.

FIG. 3*a* illustrates some non-limiting embodiments or aspects showing registration of the plurality of providing entities 102 with the system 101. In some non-limiting embodiments or aspects, each of the plurality of providing entities 103 may register by providing one or more transactional preferences. In some non-limiting embodiments or aspects, along with the one or more transactional preferences, details of the corresponding providing entity may also be collected by the system 101. For example, as shown in FIG. 3*a*, the plurality of providing entities 102 registered with the system 101 may include the first providing entity 102.1, second providing entity 102.2, third providing entity 102.3, fourth providing entity 102.4, and fifth providing entity 102.5 with the system 101. For such registration, the system 101 may be configured to collect details and corresponding transactional preferences from each of the providing entities 102.1, 102.2, 102.3, 102.4, and 102.5. In some non-limiting embodiments or aspects, the one or more transactional preferences of a providing entity may be related to Merchant Category Code (MCC) which defines the type of receiving entity preferred by the providing entity. Additionally, the one or more transaction preferences may include, but are not limited to, transaction types, form of transaction opted by the providing entity, preferred country to transact and the like. One or more other preferences related to the transactions may be collected from the providing entities 102.1, 102.2, 102.3, 102.4, and 102.5.

In some non-limiting embodiments or aspects, as shown in FIG. 3*a*, the transaction rules generate module 206 may be configured to collect the one or more transaction preferences and generate the pre-determined transaction rules 213 based on the one or more transaction preferences. In some non-limiting embodiments or aspects, during the registration, each of the providing entities 102.1, 102.2, 102.3, 102.4, and 102.5 may provide bank account details. Such bank account details may be used to debit the money during the transaction between at least one providing entity 102 and the receiving entity 103. In some non-limiting embodiments or aspects, one or more providing entities, during the registration, may initiate a transaction of a desired amount of money from a bank of a providing entity to a bank associated with the system 101. Consider, the first providing entity 102.1, during the registration, initiates a transaction of desired amount of money to the system 101. First bank 301 may be a bank associated with the first providing entity 102.1 and the second bank 302 may be a bank associated with the system 101. In such a transaction, the first bank 301 may be an issuing bank and the second bank 302 may be the acquiring bank, for completing the initiated transaction. The transacted money may be deposited in the second bank 302 and may be utilized when money is to be transferred to the receiving entity 103.

Figure 3B:
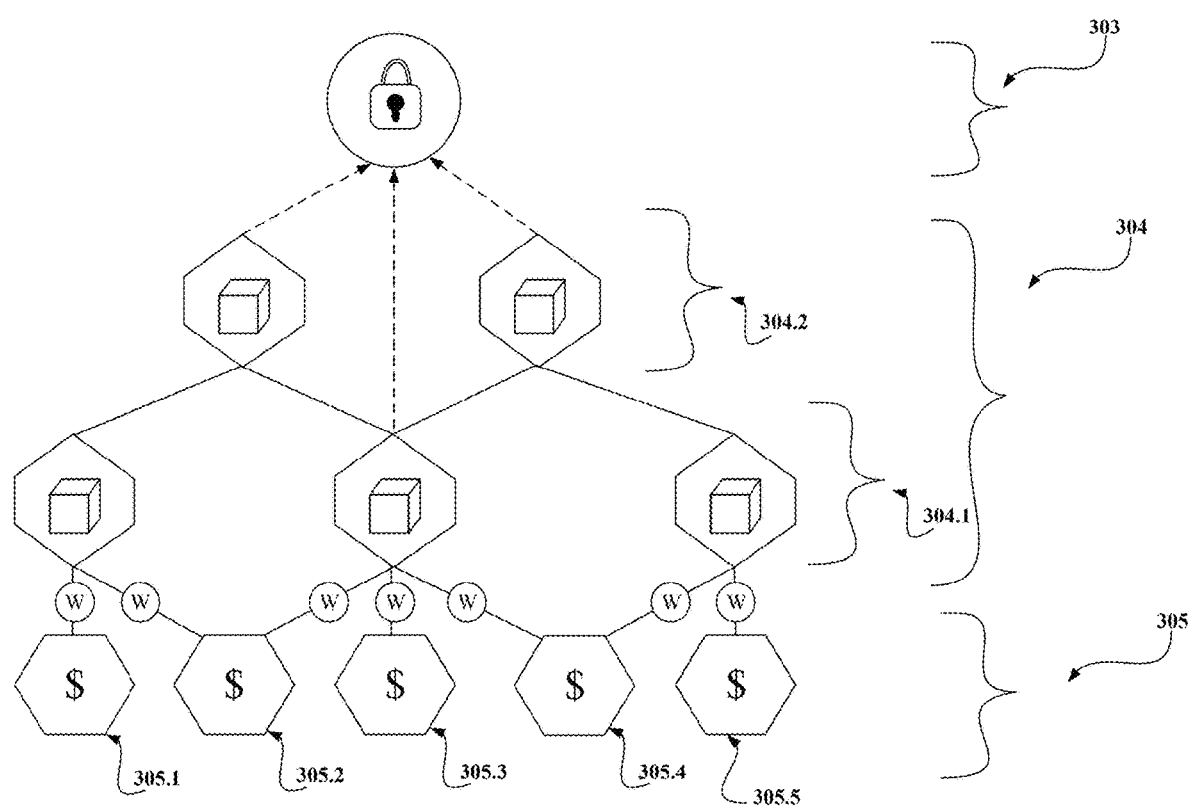

In some non-limiting embodiments or aspects, the predetermined transaction rules 213 may be a structural tree comprising the plurality of layers with a plurality of nodes. An exemplary representation of the pre-determined transactional rules is shown in FIG. 3*b*. The plurality of layers includes a bottom layer 305, one or more intermediate layers 304, and a top layer 303. Each node of the plurality of nodes in the bottom layer represents a value of the transaction to be provided by each providing entity of a plurality of providing entities. Each of the plurality of the nodes may be assigned to one of the plurality of providing entities. For example, node 305.1 may be assigned to the first providing entity 102.1, node 305.2 may be assigned to the second providing entity 102.2, node 305.3 may be assigned to the third providing entity 102.3, node 305.4 may be assigned to the fourth providing entity 102.4, and node 305.5 may be assigned to the fifth providing entity 102.5. Further, a node assigned to a particular providing entity may represent an amount of money that is contributed by that providing entity.

The plurality of nodes in the one or more intermediate layers represents each of the one or more transaction preferences provided by the plurality of providing entities. In some non-limiting embodiments or aspects, the one or more transaction preferences may be exclusive to a particular providing entity or there may be a common transaction preference between two or more providing entities. In some non-limiting embodiments or aspects, each layer in the one or more intermediate layers may relate to a single category of a transaction preference. Further, each node in the respective layer may represent various options under the single category of the transaction preference. For example, referring to FIG. 3b, the intermediate bottom layer 304.1 of the one or more intermediate layers 304 may be related to the MCC type and each of the nodes in the intermediate bottom layer 304.1 may represent different MCC types opted by the providing entities 102.1, 102.2, 102.3, 102.4, and 102.5. Similarly, the intermediate top layer 304.2 of the one or more intermediate layers 304 may be related to a country and each of the nodes in the intermediate top layer 304.2 may represent different countries that are opted by the providing entities 102.1, 102.2, 102.3, 102.4, and 102.5.

The top layer 303 of the plurality of layers comprises the single node representing a transaction token to enable the transaction between the at least one providing entity 102 and the receiving entity 103. The transaction of money based on the transaction token uses a unique identification code called a token. The token is used during a digital/online transaction in a more secure manner.

In some non-limiting embodiments or aspects, each of the plurality of nodes between the plurality of layers is linked based on the one or more transaction preferences provided by each of the providing entities 102.1, 102.2, 102.3, 102.4, and 102.5. Consider the first providing entity 102.1 and the second providing entity 102.2 are assigned with the node 305.1 and the node 305.2 for the bottom layer 305, respectively. Further, consider the one or more transactional preferences opted by the first providing entity 102.1 are represented using a first node of the intermediate bottom layer 304.1 and a first node of the intermediate top layer 304.2 of the one or more intermediate layers 304. The one or more transactional preferences opted by the second providing entity 102.2 are represented using the first node and the second node of the intermediate bottom layer 304.1 and the first node and the second node of the intermediate top layer 304.2. The first node of the intermediate top layer 304.2 and the first node of the intermediate bottom layer 304.1 may be linked to the node 305.1 of the bottom layer 305. Similarly, the first node and the second node of the intermediate bottom layer 304.1 and the first node and the second node of the intermediate top layer 304.2 may be linked with the node 305.2 of the bottom layer 305. The proposed process of linking the plurality of nodes may be performed for every node in the bottom layer 305 with every node in the one or more intermediate layer 304, as shown in FIG. 3b. Finally, nodes in the intermediate top layer 304.2 are linked with the single node of the top layer 303. By the proposed process of linking the plurality of nodes, the one or more transactional rules similar to that illustrated in FIG. 3b may be obtained.

In some non-limiting embodiments or aspects, the one or more transactional preferences provided by a providing entity may include weights for the amount of money contributed by the providing entity. The weights may vary for each of the preferences that is opted by the providing entity. A weight may indicate a percentage of money that needs to be allocated for a particular type of preference. For example, a providing entity may choose to contribute 40% of contributed money to a certain type of MCC and 60% of contributed money to another type of MCC. In some non-limiting embodiments or aspects, such weights provided by the providing entities 102.1, 102.2, 102.3, 102.4, and 102.5 may also be included in the pre-determined transactional rules. The pre-determined transactional rules shown in FIG. 3b include weights (w) associated with each of the providing entities 102.1, 102.2, 102.3, 102.4, and 102.5.

In some non-limiting embodiments or aspects, the number of nodes in each layer of the bottom layer 305 and the one or more intermediate layers 304 may increase with an increase in the number of the plurality of providing entities and the number of the one or more transactional preferences provided by each of the plurality of providing entities.

In some non-limiting embodiments or aspects, the transaction rules generate module 206, upon generating the pre-determined transactional rules, may store the pre-determined transactional rules in the memory 106 of the system 101. In some non-limiting embodiments or aspects, the transaction rules generate module 206 may be configured to re-generate the pre-determined transaction rules 213 every time a new providing entity registers with the system 101. In some non-limiting embodiments or aspects, the transaction rules generate module 206 may be configured to update the generated pre-determined transaction rules 213 every time a new providing entity registers with the system 101, by which, the one or more transactional preferences of the new providing entity may also be considered when managing the transactions.

In real-time, when the receiving entity 103 requires money or funds, the receiving entity 103 may provide the request 208 to initiate the transaction for the money or funds. In some non-limiting embodiments or aspects, the receiving entity 103 may be registered with the system 101 for providing the request 208. During the registration, the receiving entity 103 may provide one or more parameters related to the receiving entity 103. The parameters may indicate details on the amount of money required, the type of MCC the receiving entity 103 belongs to, the purpose for requesting the money, the country of establishment of the receiving entity 103, the currency preferred by the receiving entity 103, and the like. One or more other details related to the receiving entity 103 may be provided as the one or more parameters. In some non-limiting embodiments or aspects, the system 101 may use such one or more parameters for authorizing the receiving entity 103. By authorization, genuineness of the receiving entity 103 may be checked. Additionally, the receiving entity 103 may provide details of the bank account associated with the receiving entity 103. The details of the bank account may be used to debit the amount upon identification of the at least one providing entity 102 for the request 208 placed by the receiving entity 103. In some non-limiting embodiments or aspects, the plurality of receiving entities may register with the system 101. In some non-limiting embodiments or aspects, only registered and authorized receiving entities may be allowed to place the request 208 for funds. In some non-limiting embodiments or aspects, upon the registration, the receiving entity 103 may own an account and dedicated user credentials with the system 101. The receiving entity 103 may log in to the system 101 using the user credentials for placing the request 208. In some non-limiting embodiments or aspects, the online platform implementing the system 101 may include a display unit. The display unit may provision an option to the receiving entity 103 to place the request 208.

Figure 3C:
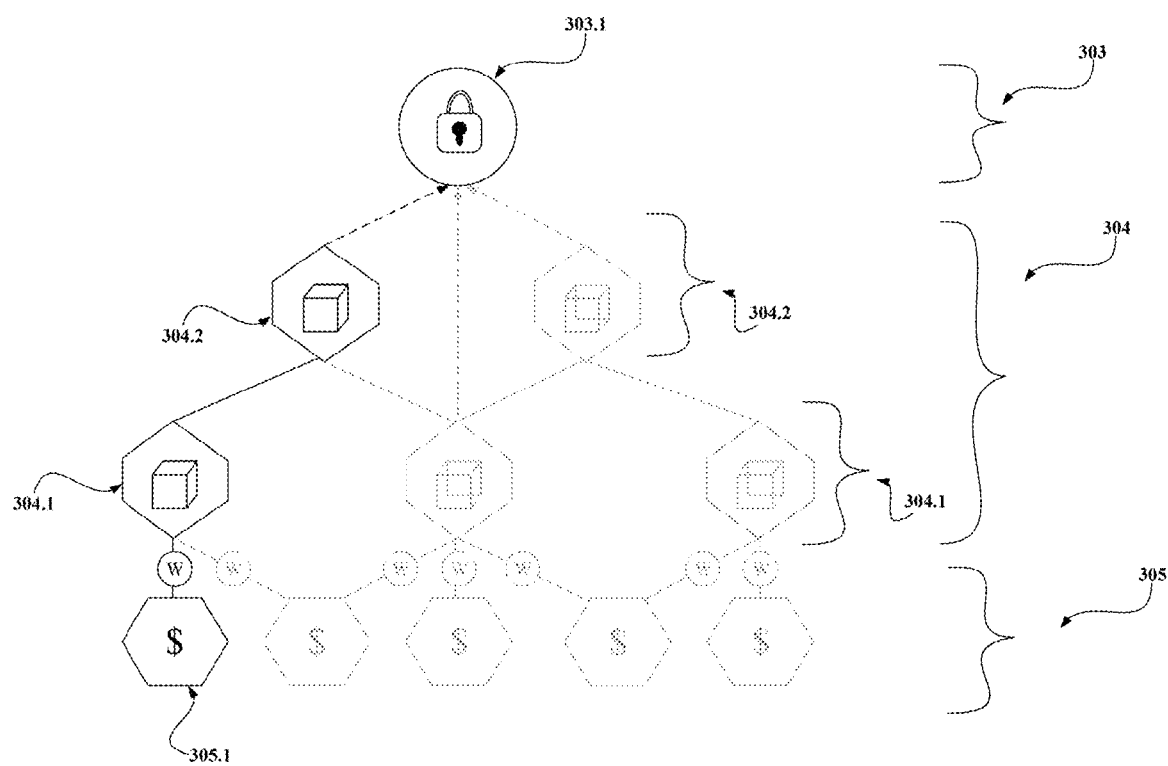
Figure 3D:
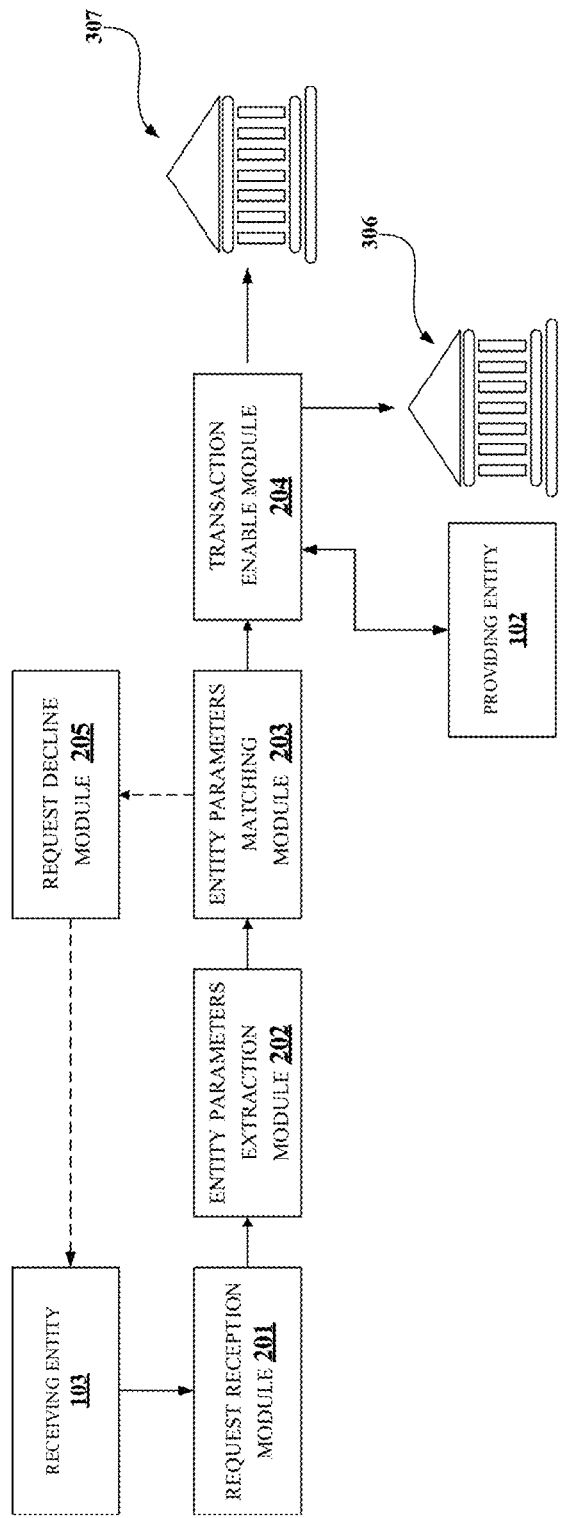

Consider the block diagram shown in FIG. 3*d*. When the receiving entity 103 places the request 208, the request reception module 201 may be configured to receive the request 208 from the receiving entity 103, as shown in FIG. 3*d*. The request 208 may be provided by the receiving entity 103 to initiate a transaction. Further, the entity parameter extraction module 202 of the system 101 may be configured to extract the one or more entity parameters 209 associated with the receiving entity 103 upon receiving the request 208, as shown in FIG. 3*d*. The one or more entity parameters 209 may be extracted from the one or more parameters provided by the receiving entity 103 during the registration. Consider the receiving entity 103 is an entity named "X" which is an orphanage located in India and requests for amount 1000 USD. In this case, the one or more transactional preferences provided by the plurality of providing entities 102 mainly relate to the type of MCC and the country. The one or more entity parameters 209 extracted for the receiving entity 103 may be "1000 USD", "orphanage", and "India".

Upon extracting the one or more entity parameters 209, the entity parameters matching module 203 of the system 101 may be configured to perform matching of each of the one or more entity parameters 209 with the pre-determined transaction rules 213, as shown in FIG. 3*d*. For matching, the entity parameters matching module 203 may be configured to identify matching nodes amongst the plurality of nodes of the plurality of layers. The matching nodes are associated with representation matching with each of the one or more entity parameters 209. Consider the pre-determined transaction rules 213 illustrated in FIG. 3*c*. The intermediate bottom layer 304.1 may be related to the type of MCC, and the intermediate top layer 304.2 may relate to the preferred countries. Node 304.1 may represent the MCC related to orphanages and node 304.2 may relate to the country U.S. Further, consider value of the node 305.1 is greater than or equal to 1000 USD. Hence, the matching nodes of the receiving entity 103 may be identified as nodes 304.1, 304.2, and 305.1.

Upon identifying the matching nodes, the entity parameters matching module 203 may be configured to activate links between the matching nodes to identify the unbroken link between at least one node in the bottom layer 305 to the single node 303.1 in the top layer 303 through nodes in the one or more intermediate layers 304. In some non-limiting embodiments or aspects, when identifying the matching nodes to identify the unbroken link, there may be one or more nodes amongst the plurality of nodes which are already associated with one or more unbroken links. Hence, the unbroken link needs to be found between nodes, amongst the plurality of nodes, with values that would fulfill the requirement of the receiving entity 103. Such nodes need to have an active balance or a remaining balance to fulfill the requirement of the receiving entity 103. In some non-limiting embodiments or aspects, output of the entity parameters matching module 203 may be stored as the matching data 210. The output may include information related to the matching nodes, the unbroken links, and the at least one node selected as the at least one providing entity 102. As shown in FIG. 3*c*, since an unbroken link is established from the node 303.1 to the node 305.1 through the nodes 304.1 and 304.2, the at least one node is the node 305.1. Hence, the entity parameters matching module 203 may be configured to select a providing entity related to the at least one node to be the at least one providing entity 102 for enabling the transaction. In the given example, the first providing entity 102.1, associated with the node 305.1, may be identified as the at least one providing entity 102 for the receiving entity 103.

Upon identifying the at least one providing entity 102, as shown in FIG. 3*d*, the transaction enable module 204 may be configured to enable a transaction between the at least one providing entity 102 to the receiving entity 103 for the request 208 received from the receiving entity 103. In some non-limiting embodiments or aspects, upon identifying the at least one providing entity 102, the transaction enable module 204 may be configured to provide a message to the at least one providing entity 102 before initiating the transaction. The message may include details on the receiving entity 103 and the amount to be debited from the contribution of the at least one providing entity 102. In some non-limiting embodiments or aspects, along with the message, an option to approve or reject the transaction may be sent to the at least one providing entity 102. The transaction may be initiated only if the at least one providing entity 102 approves the transaction. If the at least one providing entity 102 rejects the transaction, the transaction may not be initiated. In some non-limiting embodiments or aspects, when the transaction is not initiated, a message indicating declination of the request 208 may be sent to the receiving entity 103.

Referring further to FIG. 3*d*, for enabling the transaction, a connection may be established between a bank 306 and a bank 307 associated with the receiving entity 103. The bank 306 may be a bank associated with either the at least one providing entity 102 or the system 101. Consider the at least one providing entity 102 has already deposited money in the bank associated with the system 101 during the registration. In that case, the bank 306 may be the bank associated with the system 101. Otherwise, the bank 306 may be bank associated with the at least one providing entity 102. In the illustrated scenario, the bank 306 is the issuing bank and the bank 307 may be acquiring bank of the receiving entity 103. This connection provisions transfer of money from the at least one providing entity 102 to the receiving entity 103.

Figure 3E:
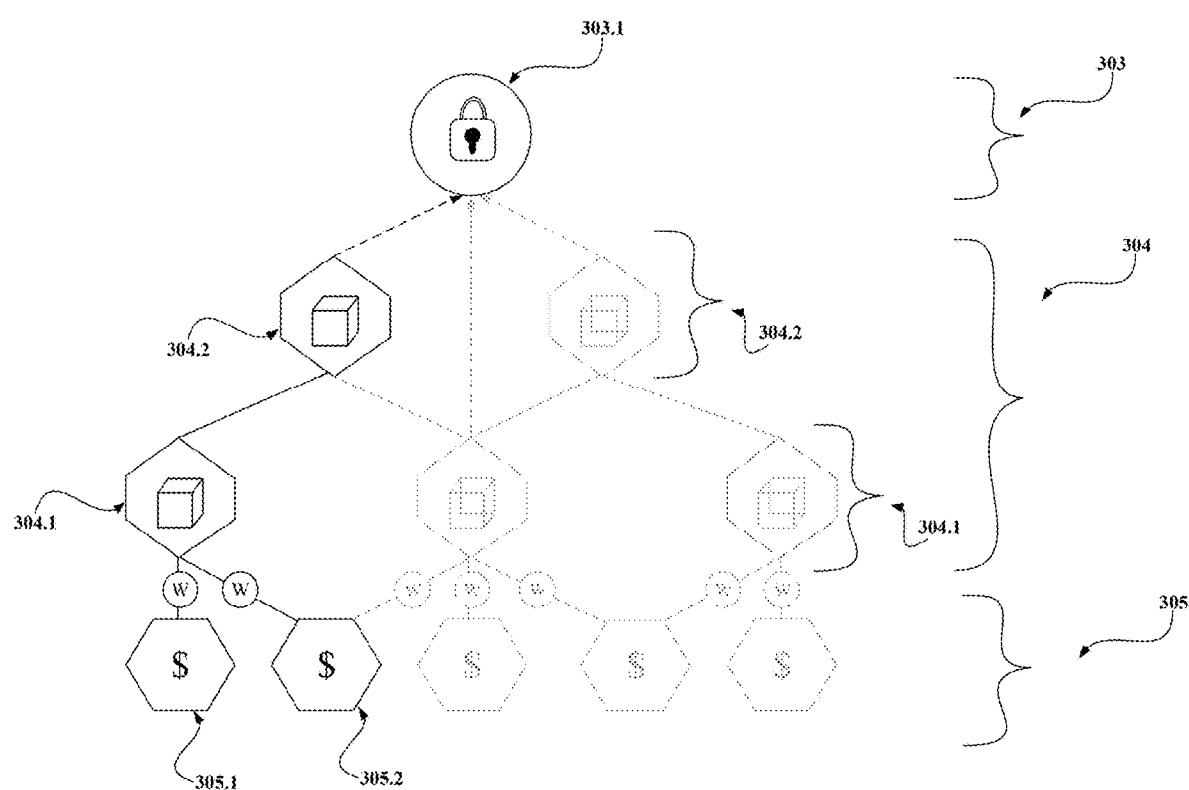

Consider a scenario where, upon performing the matching, more than two nodes in the bottom layer 305 have unbroken links with the single node 303.1 in the top layer 303, as shown in FIG. 3*e*. Thus, for such a scenario, two providing entities may be identified for the receiving entity 103. Consider the node 305.1 represents the value of 600 USD and the node 305.2 represents the value of 800 USD. Since the first providing entity 102.1, which is assigned with the node 305.1, is not contributing the amount required by the receiving entity 103, the second providing entity 102.2, which is assigned with the node 305.2, may also be identified to be one of the at least one providing entity 102 for the receiving entity 103. However, the weight associated with the node 305.1 may be 100% and weight associated with the node 305.2 may be 50%. Thus, the transaction may be enabled between the receiving entity 103 and the providing entities 102.1 and 102.2 associated with the nodes 305.1 and 305.2. In some non-limiting embodiments or aspects, consider the second providing entity 102.2 associated with the node 305.2 has preferred to contribute only 30% of contribution to orphanages. Thus, the weight associated with the node 305.1 may be 100% and the weight associated with the node 305.2 may be 30%. In such cases, complete amount of money requested by the receiving entity 103 may not be transferred. In some non-limiting embodiments or aspects, the transaction may be initiated only if the two or more providing entities approve the transaction.

Figure 3F:
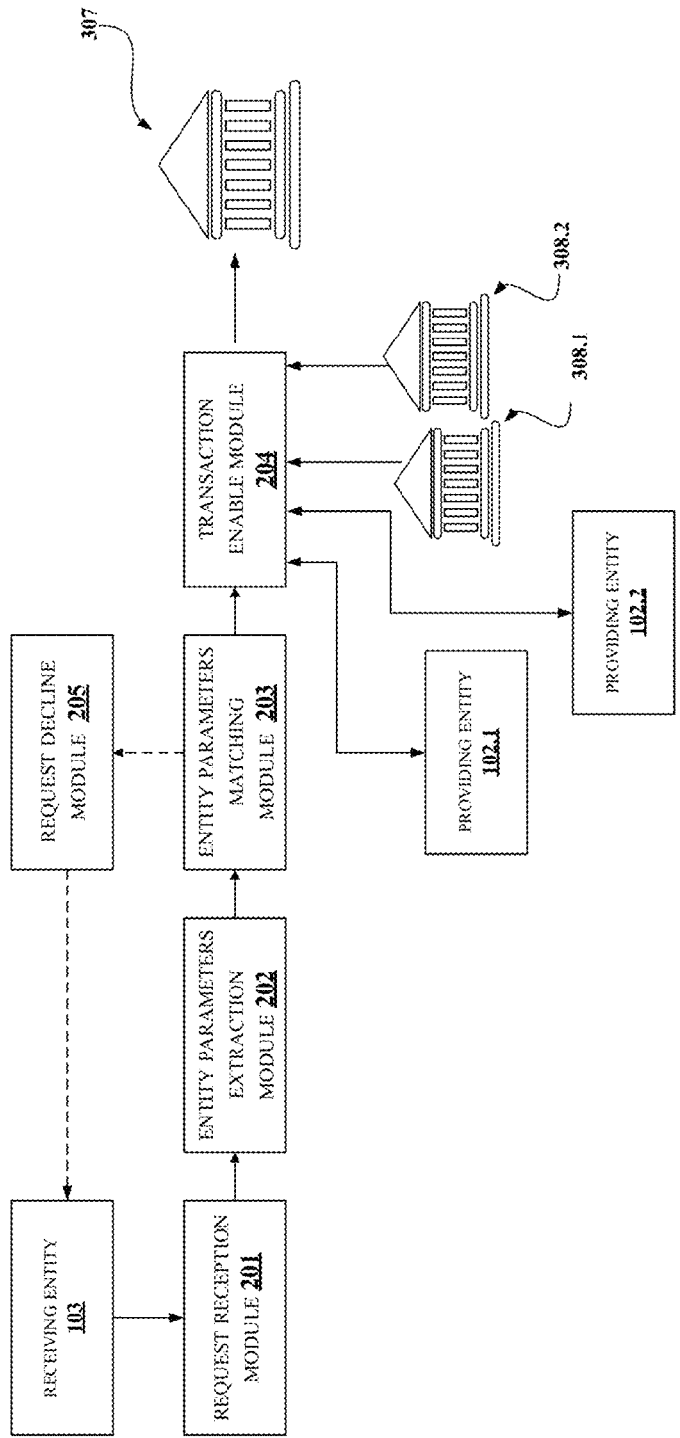

Consider a scenario illustrated in FIG. 3f, where, using the request reception module 201, the entity parameter extraction module 202, and the entity parameters matching module 203, the providing entities 102.1 and 102.2 are identified for the receiving entity 103. For enabling the transaction between the providing entities 102.1 and 102.2 and the receiving entity 103, as shown in FIG. 3f, a connection may be established between banks 308.1 and 308.2 of the providing entities 102.1 and 102.2 and the bank 307 associated with the receiving entity 103. In the case where the providing entities 102.1 and 102.2 have already deposited money in the bank associated with the system 101, during the registration, the bank associated with the system 101 may communicate with the bank 307. In some non-limiting embodiments or aspects, output of the transaction enable module 204 may be stored as the transaction enable data 211. The output may include information related to banks required for the transaction, approval or rejection provided by the at least one providing entity 102 for the transaction, and the like. In some non-limiting embodiments or aspects, upon completion of the transaction, a notification or a message may be forwarded to the at least one providing entity, indicating utilization of their deposited money. In some non-limiting embodiments or aspects, the notification may include one or more details or information related to the receiving entity 103.

Figure 3G:
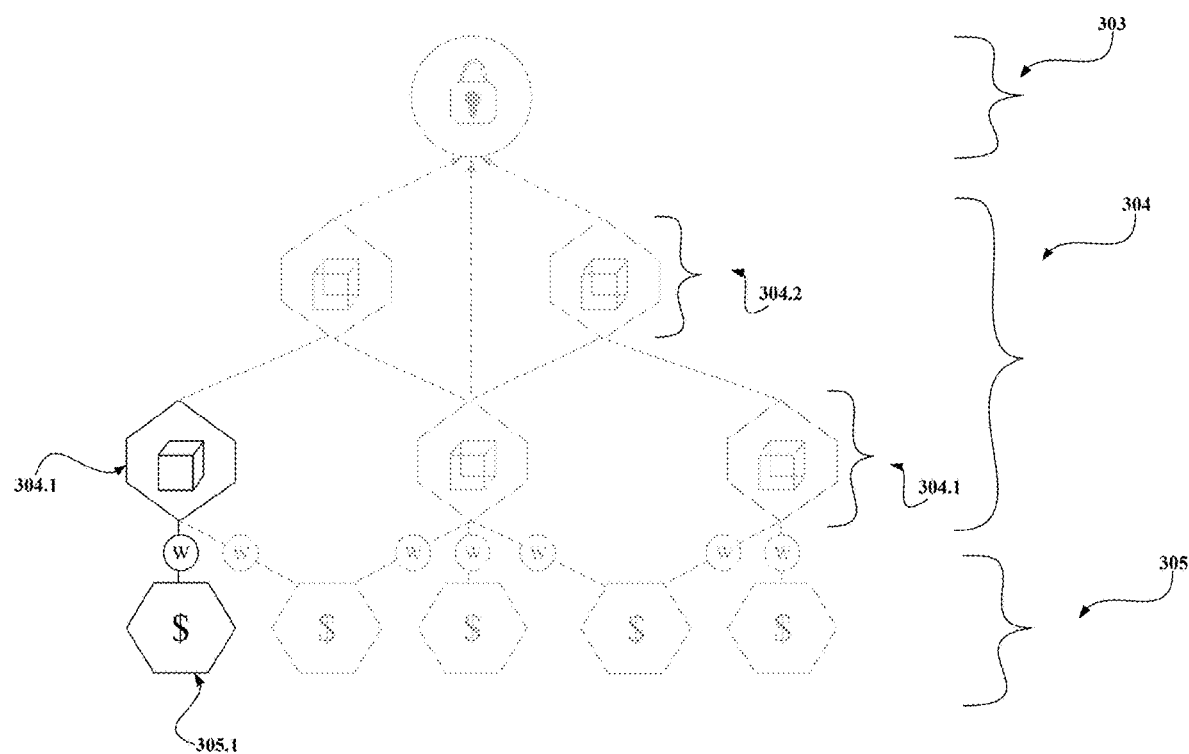
Figure 3H:
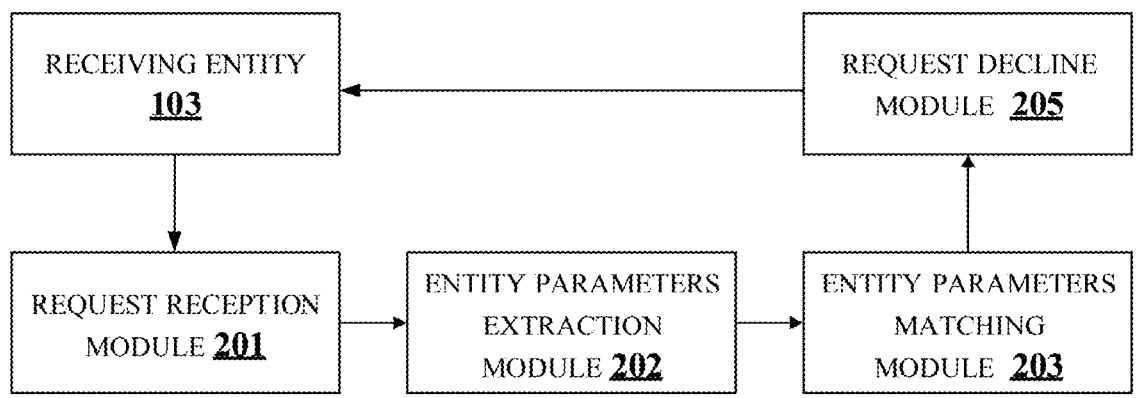

Consider a scenario, where using the request reception module 201, the entity parameter extraction module 202, and the entity parameters matching module 203, the at least one providing entity may not be identified for the receiving entity 103, as shown in FIG. 3h. The at least one providing entity may not be identified when no unbroken link is identified from the bottom layer 305 to the top layer 303 through the one or more intermediate layers 304 as shown in FIG. 3g. In that case, the at least one providing entity 102 may not be identified for the request 208 received from the receiving entity 103. Thus, as shown in FIG. 3h, the request decline module 205 may be configured to decline the request. A message indicating the decline of the request 208 may be provided to the receiving entity 103. In some non-limiting embodiments or aspects, output of the request decline module 205 may be stored as the request decline data 212. The output may include a message to be sent to the receiving entity 103. In some non-limiting embodiments or aspects, the output may also include the reason for declining the transaction. The reason may include, but is not limited to, "insufficient funds", "providing entity not found", "request rejected by providing entity", and the like.

The other data 214 may store data, including temporary data and temporary files, generated by modules for performing the various functions of the system 101. The one or more modules 107 may also include other modules 207 to perform various miscellaneous functionalities of the system 101. It will be appreciated that such modules may be represented as a single module or a combination of different modules.

Figure 4A:
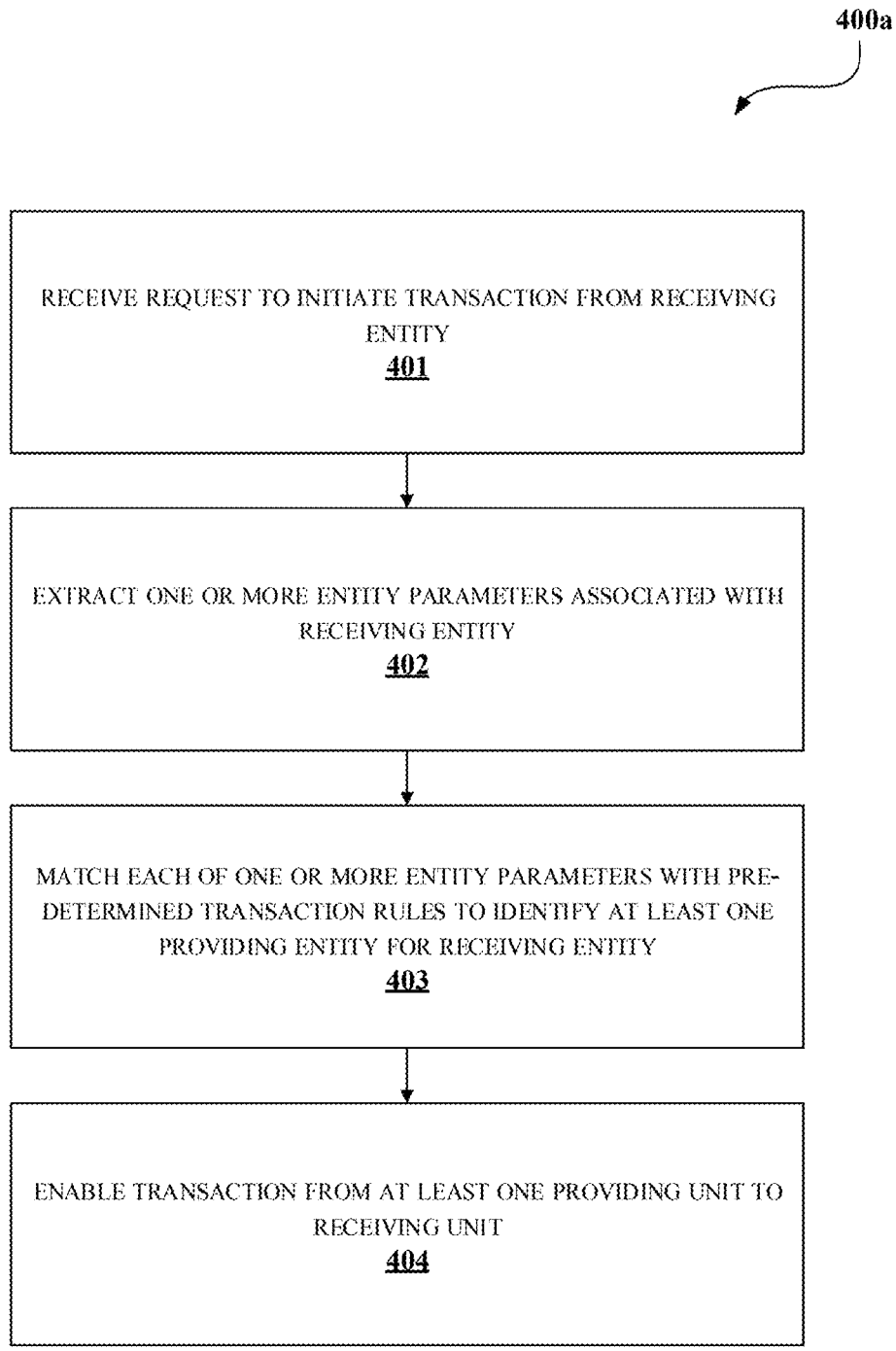
FIGS. 4a-4b illustrate flowcharts showing exemplary methods for managing transaction between a providing entity and a receiving entity in accordance with some non-limiting embodiments or aspects of the present disclosure.

FIG. 4a illustrates a flowchart 400a showing an exemplary method to manage a transaction between the providing entity 102 and the receiving entity 103. The proposed method may be implemented in an online platform, where the providing entity 102 and the receiving entity 103 may provide respective preferences and parameters. Based on the preferences and the parameters, the transaction between the at least one providing entity 102 and the receiving entity 103 may be enabled.

Initially, at block 401, the request reception module 201 of the system 101 may be configured to receive the request 208 from the receiving entity 103. The request 208 may be provided by the receiving entity 103 to initiate a transaction. For example, when the receiving entity 103 requires money or funds, the receiving entity 103 may place the request 208 in the system 101. In some non-limiting embodiments or aspects, the request 208 may be placed via the online platform implementing the system 101. In some non-limiting embodiments or aspects, the receiving entity 103 needs to be registered with the system 101 to provide the request 208. In some non-limiting embodiments or aspects, the receiving entity 103 may simultaneously register and provide the request 208 to the system 101. For the registration, the receiving entity 103 may provide details related to the transaction. Such details may include, but are not limited to, the purpose of the request 208, the amount required, the type of establishment of the receiving entity 103, and the like.

At block 402, the entity parameter extraction module 202 of the system 101 may be configured to extract the one or more entity parameters 209 associated with the receiving entity 103 upon receiving the request 208. The one or more entity parameters 209 may be extracted from the details provided by the receiving entity 103 during the registration. The one or more entity parameters 209 may be associated with the one or more transaction preferences provided by the plurality of providing entities 102.

At block 403, the entity parameters matching the module 203 of the system 101 may be configured to perform matching of each of the one or more entity parameters 209 with the pre-determined transaction rules 213 related to the plurality of providing entities 102. The matching may be performed to identify the at least one providing entity 102 for the receiving entity 103.

In some non-limiting embodiments or aspects, the transaction rules generate module 206 may be configured to generate the pre-determined transaction rules 213, based on the one or more transaction preferences provided by each of the plurality of providing entities. In some non-limiting embodiments or aspects, the pre-determined transaction rules 213 may be the structural tree comprising the plurality of layers with the plurality of nodes. The plurality of layers includes the bottom layer, the one or more intermediate layers, and the top layer. Each node of plurality of nodes in the bottom layer represents a value of the transaction to be provided by the providing entity of the plurality of providing entities 102. The plurality of nodes in the one or more intermediate layers represents each of the one or more transaction preferences provided by the plurality of providing entities. The top layer of plurality of layers comprises the single node representing the transaction token to enable the transaction between the at least one providing entity 102 and the receiving entity 103. In some non-limiting embodiments or aspects, each of the plurality of nodes between the plurality of layers is linked based on the one or more transaction preferences provided by each of the plurality of providing entities 102.

Figure 4B:
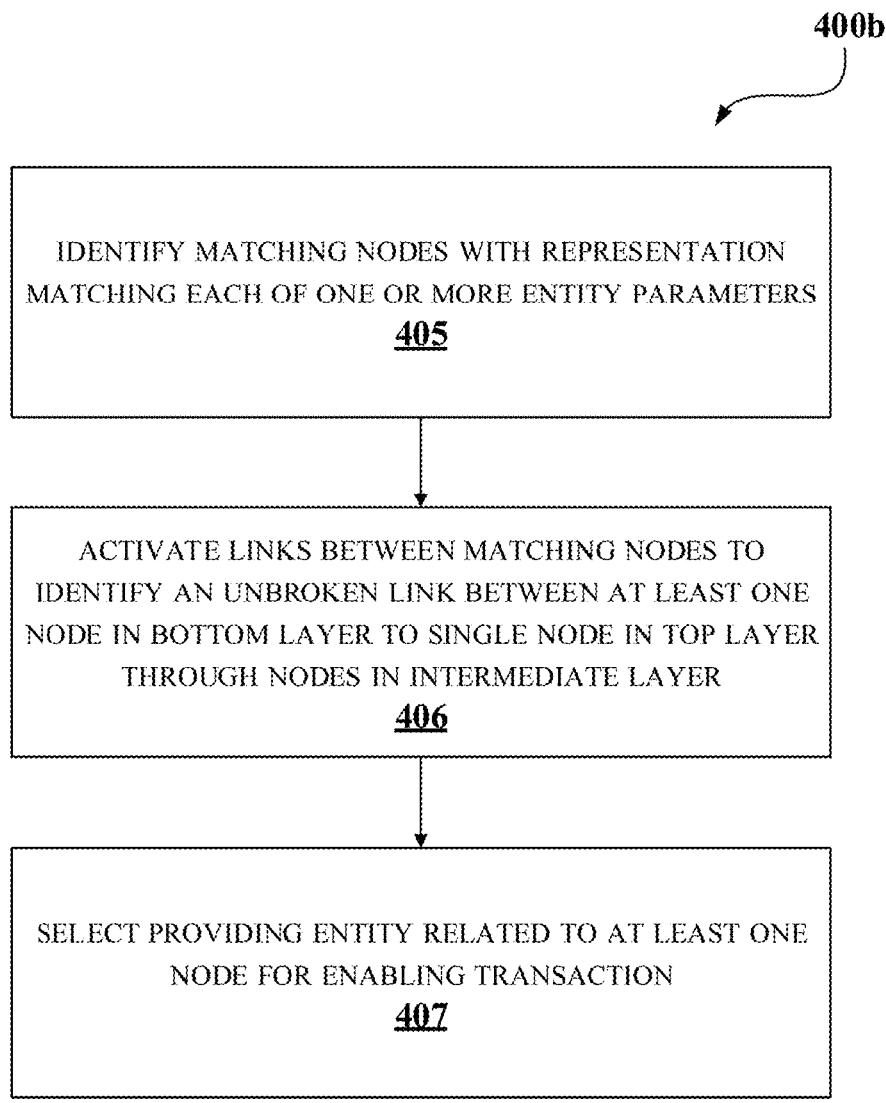

FIG. 4b illustrates a flowchart 400b showing an exemplary method for matching each of the one or more entity parameters 209 with the pre-determined transaction rules 213 related to the plurality of providing entities, in accordance with some non-limiting embodiments or aspects of present disclosure. At block 405, the entity parameters matching module 203 may be configured to identify matching nodes amongst the plurality of nodes of the plurality of layers. The matching nodes are associated with a representation matching with each of the one or more entity parameters 209.

At block 406, the entity parameters matching module 203 may be configured to activate links between the matching nodes to identify the unbroken link between at least one node in the bottom layer to the single node in the top layer through nodes in the one or more intermediate layers.

At block 407, upon the activation, the entity parameters matching module 203 may be configured to select a providing entity related to the at least one node to be the at least one providing entity 102 for enabling the transaction.

Referring back to FIG. 4a, upon identifying the at least one providing entity 102, at block 404, the transaction enable module 204 may be configured to enable a transaction between the at least one providing entity 102 to the receiving entity 103 for the request 208 received from the receiving unit. For enabling the transaction, connection may be established between a bank associated with either the at least one providing entity 102 or the system 101 with a bank associated with the receiving entity 103. This connection provisions transfer of money from the at least one providing entity 102 to the receiving entity 103.

In some non-limiting embodiments or aspects, upon performing step in block 403, no unbroken link is identified from the bottom layer to the top layer through the one or more intermediate layers. In that case, the at least one providing entity 102 may not be identified for the request 208 received from the receiving entity 103. Thus, the request decline module 205 may be configured to decline the request 208. A message indicating the decline of the request 208 may be provided to the receiving module.

In some non-limiting embodiments or aspects, the steps proposed in FIGS. 4a and 4b may be performed for every request received from a receiving entity 103. At an instant of time, when multiple requests are received from multiple receiving entities, the one or more modules of the system 101 may be configured to perform the proposed steps simultaneously for each of the multiple requests.

As illustrated in FIGS. 4a and 4b, the methods 400a and 400b may include one or more blocks for executing processes in the system 101. The methods 400a and 400b may be described in the general context of computer executable instructions. Generally, computer executable instructions can include routines, programs, objects, components, data structures, procedures, modules, and functions, which perform particular functions or implement particular abstract data types.

The order in which the methods 400a and 400b are described may not be intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Some non-limiting embodiments or aspects of the present disclosure provide a transparent process to carry monetary transactions between the providing entity and the receiving entity. Some non-limiting embodiments or aspects of the present disclosure provisions to consider preferences of the providing entity for generating transaction rules. The transaction rules are used to initiate a transaction between the receiving entity and the providing entity. Some non-limiting embodiments or aspects of the present disclosure provide an automated system to identify the providing entity suitable for the receiving entity, based on matching the preferences and parameters of the providing entity and the receiving entity.

Computing System

Figure 5:
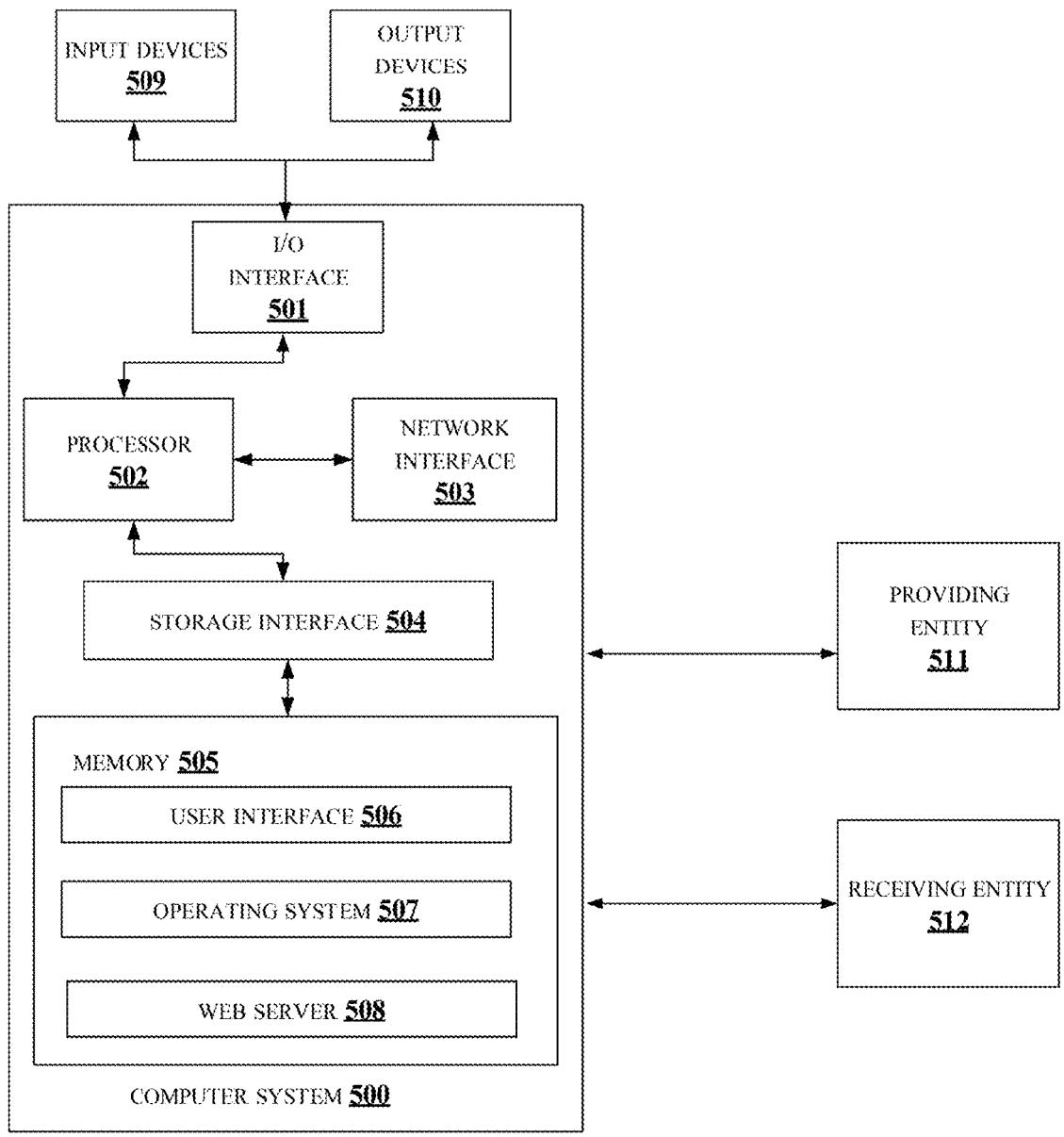
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In some non-limiting embodiments or aspects, the computer system 500 is used to implement the system 101 for managing a transaction between a providing entity 511 and a receiving entity 512. The computer system 500 may include a central processing unit ("CPU" or "processor") 502. The processor 502 may include at least one data processor for executing processes in Virtual Storage Area Network. The processor 502 may include specialized processing units such as integrated system (bus) controllers, memory management control units, floating point units, graphics processing units, digital signal processing units, etc.

The processor 502 may be disposed in communication with one or more input/output (I/O) devices 509 and 510 via an I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), radio frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax®, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

In some non-limiting embodiments or aspects, the computer system 500 may consist of the system 101 configured to manage a transaction between the providing entity 511 and the receiving entity 512. The processor 502 may be disposed in communication with a communication network (not shown in FIG. 5) via a network interface 503. The network interface 503 may communicate with the communication network. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface 503 and the communication network, the computer system 500 may communicate with at least one of the providing entity 511 and the receiving entity 512 for managing the transaction. The network interface 503 may employ connection protocols that include, but are not limited to, direct connect, Ethernet (e.g., twisted pair 10/100/1000 Base T), transmission control protocol/internet protocol (TCP/IP), token ring, IEEE 802.11a/b/g/n/x, etc.

The communication network includes, but is not limited to, a direct interconnection, an e-commerce network, a peer to peer (P2P) network, local area network (LAN), wide area network (WAN), wireless network (e.g., using Wireless Application Protocol), the Internet, Wi-Fi®, and the like. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices including routers, bridges, servers, computing devices, storage devices, etc.

In some non-limiting embodiments or aspects, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc. employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, a user interface 506, an operating system 507, a web browser 508, etc. In some non-limiting embodiments or aspects, computer system 500 may store user/application data, such as the data, variables, records, etc., as described in this disclosure. Such databases may be implemented as fault-tolerant, relational, scalable, secure databases, such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™ GOOGLE® ANDROID™, BLACKBERRY® OS, or the like.

In some non-limiting embodiments or aspects, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some non-limiting embodiments or aspects, the computer system 500 may implement a mail server stored program component. The mail server may be an Internet mail server such as Microsoft Exchange, or the like. The mail server may utilize facilities such as ASP, ActiveX, ANSI C++/C#, Microsoft.NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some non-limiting embodiments or aspects, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., be non-transitory. Examples include Random Access Memory (RAM), Read-Only Memory (ROM), volatile memory, non-volatile memory, hard drives, Compact Disc (CD) ROMs, DVDs, flash drives, disks, and any other known physical storage media.

The described operations may be implemented as a method, system, or article of manufacture using standard programming and/or engineering techniques to produce software, firmware, hardware, or any combination thereof. The described operations may be implemented as code maintained in a "non-transitory computer-readable medium", where a processor may read and execute the code from the computer-readable medium. The processor is at least one of a microprocessor and a processor capable of processing and executing the queries. A non-transitory computer-readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes a non-transitory computer-readable medium and/or hardware logic in which code may be implemented. A device in which the code implementing the described embodiments of operations is encoded may include a computer-readable medium or hardware logic. Of course, those skilled in the art will recognize that many modifications may be made to this configuration without departing from the scope of the disclosure and that the article of manufacture may include suitable information bearing medium known in the art.

The terms "some non-limiting embodiments or aspects", "embodiment", "embodiments", "the embodiment", "the embodiments", "one or more embodiments", and "some non-limiting embodiments or aspects" mean "one or more (but not all) embodiments of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIGS. 4a and 4b show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

A description of some non-limiting embodiments or aspects with several components in communication with each other does not imply that all such components are required. On the contrary, a variety of optional components is described to illustrate the wide variety of possible embodiments of the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method for managing a transaction between a providing entity and a receiving entity, the method comprising:
   receiving a first plurality of entity parameters for each of a plurality of receiving entities;
   receiving a second plurality of entity parameters for each of a plurality of providing entities;
   registering the plurality of receiving entities based on the first plurality of entity parameters;
   registering the plurality of providing entities based on the second plurality of entity parameters;
   receiving a request to initiate a transaction from a receiving entity of the plurality of receiving entities;
   extracting one or more entity parameters of the first plurality of entity parameters associated with the receiving entity upon receiving the request;
   matching each of the one or more entity parameters with pre-determined transaction rules related to the plurality of providing entities to identify at least one providing entity of the plurality of providing entities for the receiving entity, wherein the pre-determined transaction rules comprise a structural tree comprising a plurality of layers with a plurality of nodes, wherein each node of the plurality of nodes in a bottom layer of the plurality of layers represents a transaction value to be provided by one of the plurality of providing entities, wherein the plurality of nodes in intermediate layers of the plurality of layers represents one or more transaction preferences from the second plurality of entity parameters of the plurality of providing entities, wherein a top layer of the plurality of layers comprises a single node representing a transaction token configured to enable the transaction between the at least one providing entity and the receiving entity, and wherein the matching comprises:
   identifying matching nodes amongst the plurality of nodes of the plurality of layers associated with a representation matching each of the one or more entity parameters;
   activating links between the matching nodes to identify an unbroken link between at least one node in the bottom layer to the single node in the top layer through nodes in the intermediate layers; and
   selecting a providing entity related to the at least one node to be the at least one providing entity for enabling the transaction; and
   enabling the transaction from the at least one providing entity to the receiving entity.

2. The computer-implemented method of claim 1, further comprising declining the request when the at least one providing entity is not identified upon performing matching of each of the one or more entity parameters with the pre-determined transaction rules related to the plurality of providing entities.

3. The computer-implemented method of claim 1, further comprising generating the pre-determined transaction rules based on the one or more transaction preferences provided by each of the plurality of providing entities.

4. The computer-implemented method of claim 1, wherein each of the plurality of nodes between the plurality of layers is linked based on the one or more transaction preferences provided by each of the plurality of providing entities.

5. A system, comprising:
   one or more processors; and
   a memory communicatively coupled to the one or more processors, wherein the memory stores processor-executable instructions, which, on execution, cause the one or more processors to:
   receive a first plurality of entity parameters from each of a plurality of receiving entities;
   receive a second plurality of entity parameters for each of a plurality of providing entities;
   register the plurality of receiving entities based on the first plurality of entity parameters;
   register the plurality of providing entities based on the second plurality of entity parameters;
   receive a request to initiate a transaction from a receiving entity of the plurality of receiving entities;
   extract one or more entity parameters of the first plurality of entity parameters associated with the receiving entity upon receiving the request;
   match each of the one or more entity parameters with pre-determined transaction rules related to the plurality of providing entities to identify at least one providing entity of the plurality of providing entities for the receiving entity, wherein the pre-determined transaction rules comprise a structural tree comprising a plurality of layers with a plurality of nodes, wherein each node of the plurality of nodes in a bottom layer of the plurality of layers represents a transaction value to be provided by one of the plurality of providing entities, wherein the plurality of nodes in intermediate layers of the plurality of layers represents one or more transaction preferences from the second plurality of entity parameters of the plurality of providing entities, wherein a top layer of the plurality of layers comprises a single node representing a transaction token configured to enable the transaction between the at least one providing entity and the receiving entity, and wherein, when matching, the instructions cause the at least one processor to:

identify matching nodes amongst the plurality of nodes of the plurality of layers associated with a representation matching each of the one or more entity parameters;

activate links between the matching nodes to identify an unbroken link between at least one node in the bottom layer to the single node in the top layer through nodes in the intermediate layers; and select a providing entity related to the at least one node to be the at least one providing entity for enabling the transaction; and enable the transaction from the at least one providing entity to the receiving entity.

6. The system of claim 5, wherein the one or more processors are further configured to decline the request when the at least one providing entity is not identified upon performing matching of each of the one or more entity parameters with the transaction rules related to the plurality of providing entities.

7. The system of claim 5, wherein the one or more processors are further configured to generate the pre-determined transaction rules based on the one or more transaction preferences provided by each of the plurality of providing entities.

8. The system of claim 5, wherein each of the plurality of nodes between the plurality of layers is linked based on the one or more transaction preferences provided by each of the plurality of providing entities.

9. A non-transitory computer-readable medium including instructions stored thereon that when processed by one or more processors cause a system to:

receive a first plurality of entity parameters from each of a plurality of receiving entities;

receive a second plurality of entity parameters for each of a plurality of providing entities;

register the plurality of receiving entities based on the first plurality of entity parameters;

register the plurality of providing entities based on the second plurality of entity parameters;

receive a request to initiate a transaction from a receiving entity of the plurality of receiving entities;

extract one or more entity parameters of the first plurality of entity parameters associated with the receiving entity upon receiving the request;

match each of the one or more entity parameters with pre-determined transaction rules related to the plurality of providing entities to identify at least one providing entity of the plurality of providing entities for the receiving entity, wherein the pre-determined transaction rules comprise a structural tree comprising a plurality of layers with a plurality of nodes, wherein each node of the plurality of nodes in a bottom layer of the plurality of layers represents a transaction value to be provided by one of the plurality of providing entities, wherein the plurality of nodes in intermediate layers of the plurality of layers represents one or more transaction preferences from the second plurality of entity parameters of the plurality of providing entities, wherein a top layer of the plurality of layers comprises a single node representing a transaction token configured to enable the transaction between the at least one providing entity and the receiving entity, and wherein when matching, the instructions further cause the system to:

identify matching nodes amongst the plurality of nodes of the plurality of layers associated with a representation matching each of the one or more entity parameters;

activate links between the matching nodes to identify an unbroken link between at least one node in the bottom layer to the single node in the top layer through nodes in the intermediate layers; and select a providing entity related to the at least one node to be the at least one providing entity for enabling the transaction; and enable the transaction from the at least one providing entity to the receiving entity.

10. The medium of claim 9, wherein the instructions cause the system to decline the request when the at least one providing entity is not identified upon performing matching of each of the one or more entity parameters with the transaction rules related to the plurality of providing entities.

11. The medium of claim 9, wherein the instructions cause the system to generate the pre-determined transaction rules based on the one or more transaction preferences provided by each of the plurality of providing entities.

12. The medium of claim 11, wherein each of the plurality of nodes between the plurality of layers is linked based on the one or more transaction preferences provided by each of the plurality of providing entities.

\* \* \* \* \*